(12) United States Patent
Huang et al.

(10) Patent No.: US 7,102,592 B2
(45) Date of Patent: Sep. 5, 2006

(54) VIDEO SIGNAL CONVERTER FOR A DETACHABLE DISPLAY MODULE OF A PORTABLE COMPUTER

(75) Inventors: Ching-Bin Huang, Taipei (TW); Chih-Chuan Cheng, Taipei (TW); Wei-Pin Chuang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 380 days.

(21) Appl. No.: 10/603,618

(22) Filed: Jun. 26, 2003

(65) Prior Publication Data

US 2004/0263423 A1    Dec. 30, 2004

(51) Int. Cl.
*G09G 5/00* (2006.01)
(52) U.S. Cl. .......................... 345/1.1; 345/1.2; 345/1.3
(58) Field of Classification Search .......... 345/1.1–1.3, 345/3.1–3.4, 4–6; 361/681–686, 724–727
See application file for complete search history.

(56) References Cited

U.S. PATENT DOCUMENTS

| 4,964,018 | A | * | 10/1990 | Mallory et al. | ............. 361/725 |
| 5,790,193 | A | * | 8/1998 | Ohmori | ...................... 348/375 |
| 6,310,768 | B1 | * | 10/2001 | Kung et al. | ................. 361/681 |
| 6,317,315 | B1 | * | 11/2001 | Lee et al. | ................... 361/681 |
| 6,757,551 | B1 | * | 6/2004 | Newman et al. | ......... 455/556.1 |

* cited by examiner

*Primary Examiner*—Vijay Shankar
(74) *Attorney, Agent, or Firm*—Bacon & Thomas, PLLC

(57) ABSTRACT

A video signal converter receives an input video signal from a host and transmits an output video signal to a detachable display module of a portable computer. The video signal converter includes a base, a latch unit and a video processing unit. The base supports the display module thereon. The latch unit engages removably the display module when the display module is supported on the base. The video signal processing unit is operable so as to convert the input video signal into the output video signal that is suitable for use by the display module.

9 Claims, 7 Drawing Sheets

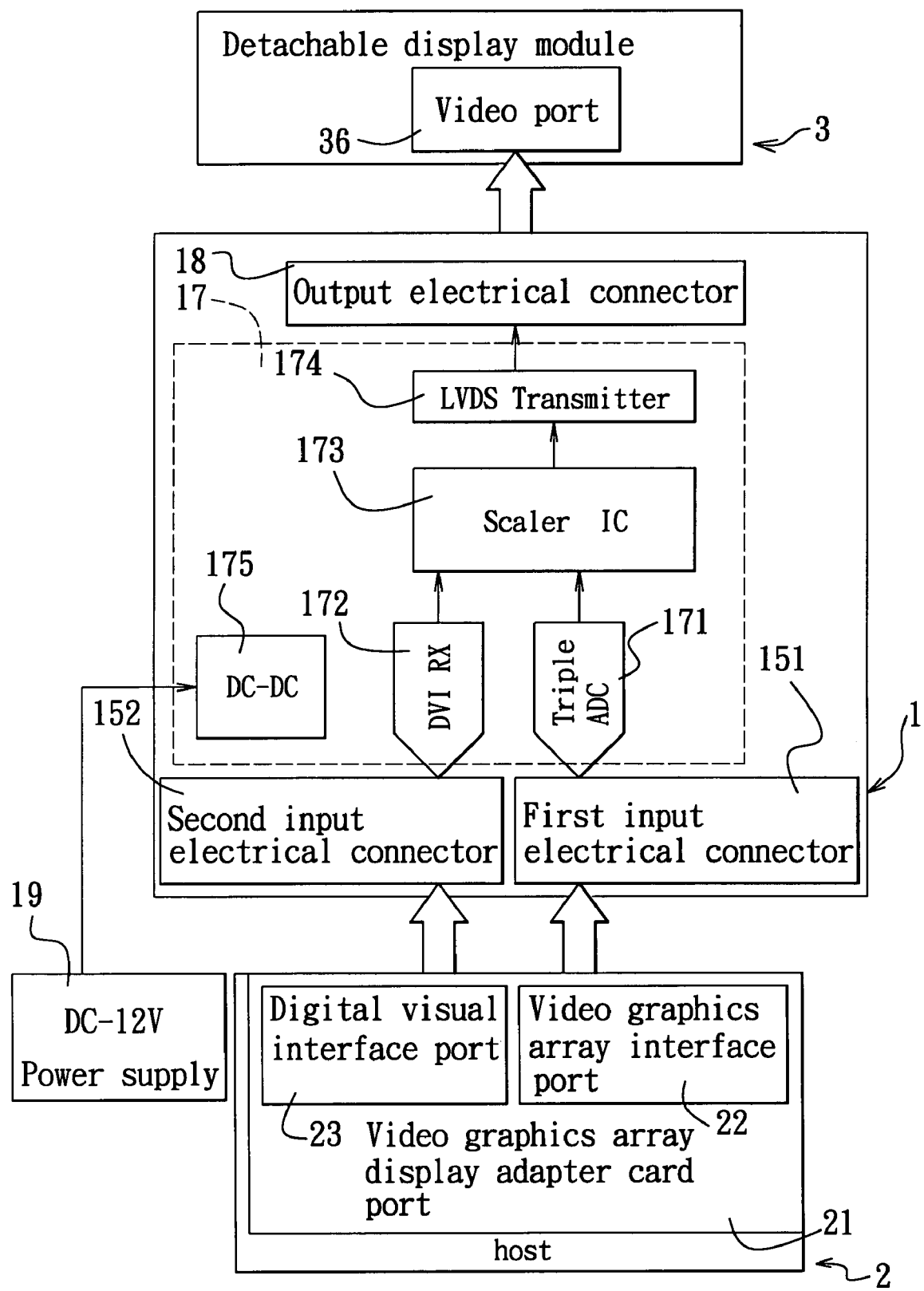
F I G. 2

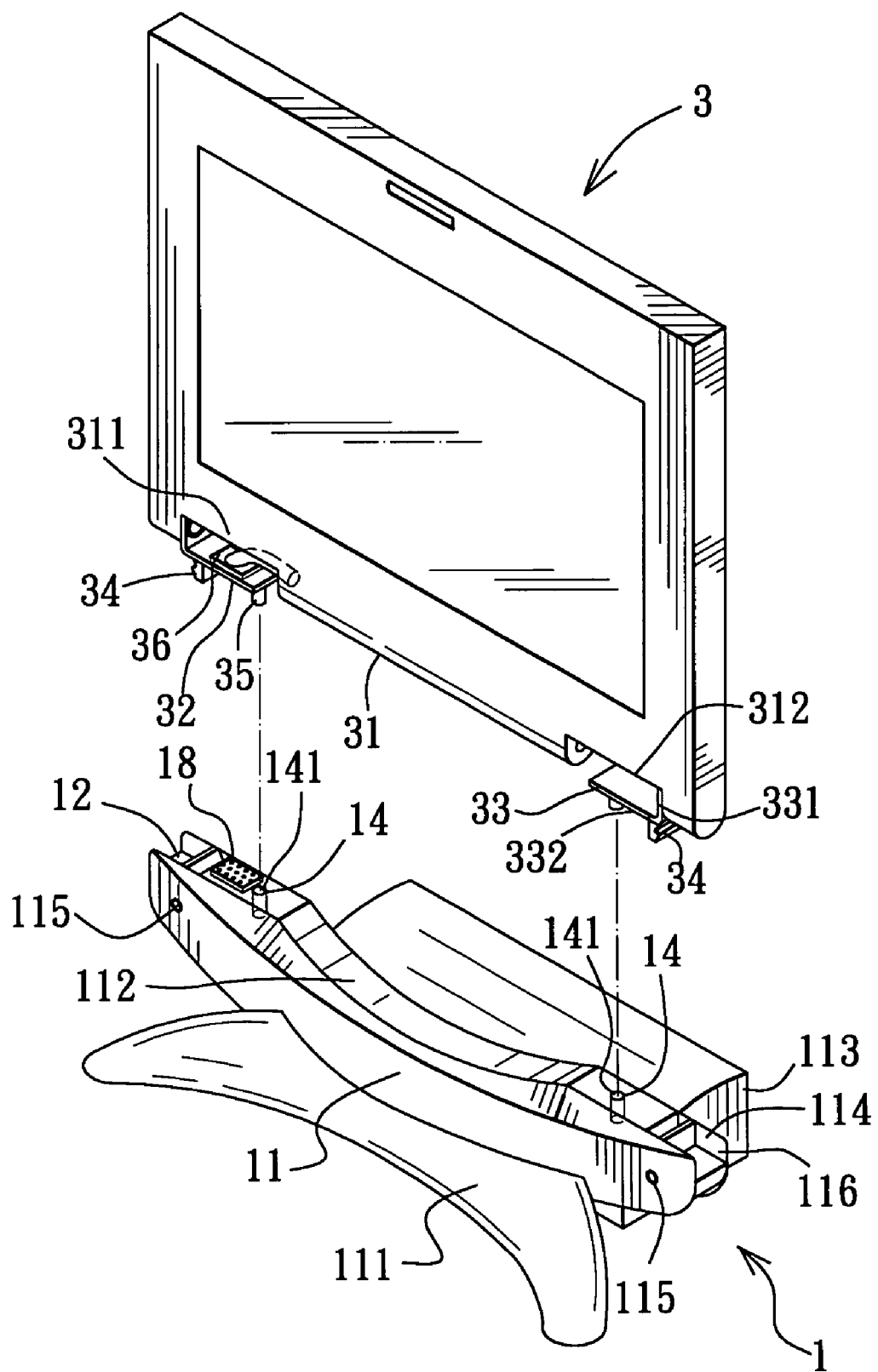
F I G. 3

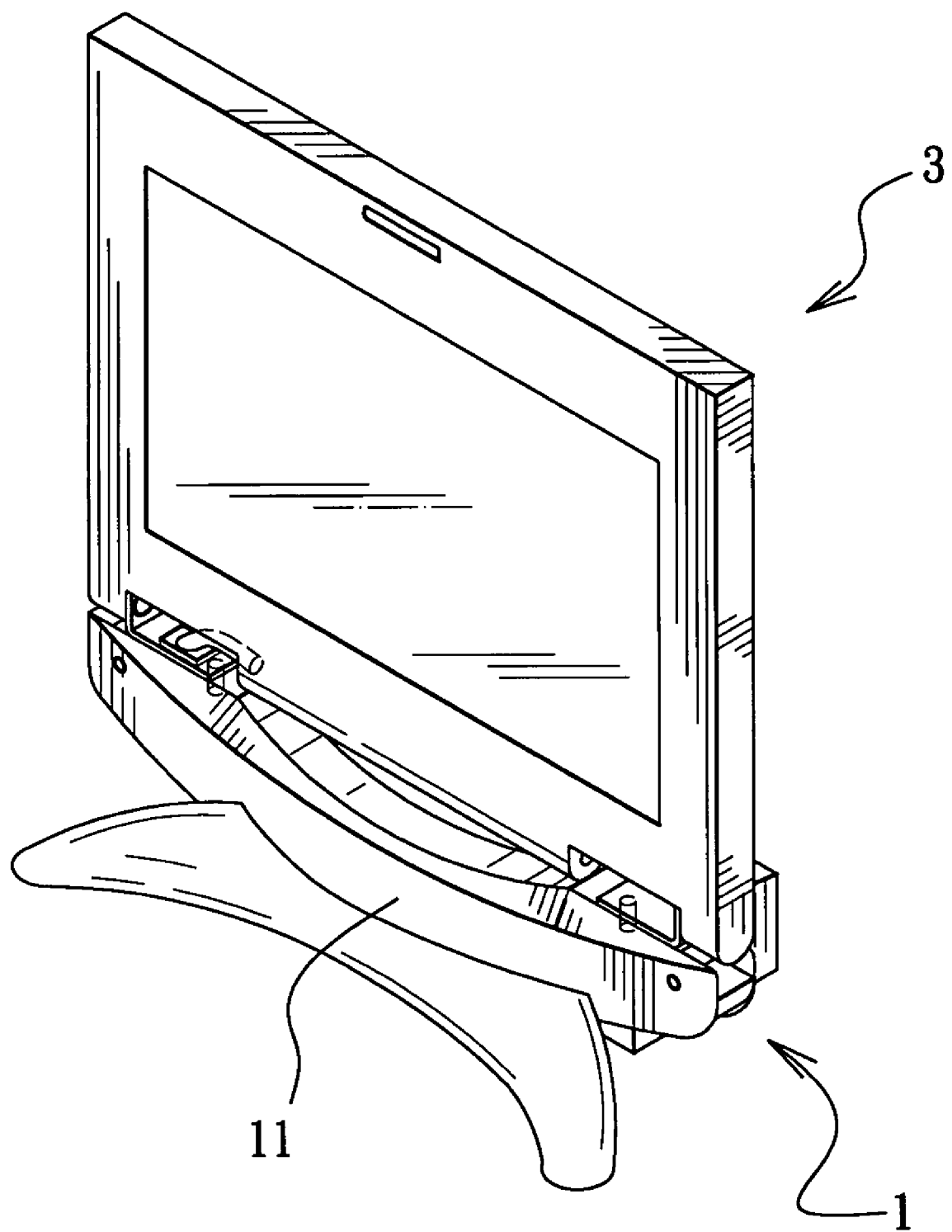
F I G. 5

VIDEO SIGNAL CONVERTER FOR A DETACHABLE DISPLAY MODULE OF A PORTABLE COMPUTER

BACKGROUND OF THE INVENTION

1. Field of the Invention

The invention relates to a video signal converter, more particularly to a video signal converter for a detachable display module of a portable computer.

2. Description of the Related Art

Computer systems with dual display functionality are well known. The dual display functionality permits two different sets of information to be displayed simultaneously on two computer monitors. This is useful when a user needs to compare related information such as data and graphics, or simply wants to surf different websites at the same time. One method of configuring the dual display functionality involves the use of two video graphics array adapter cards installed on a host system of a desktop computer, two computer monitors connected to the adapter cards, and software for configuring the adapter cards and the computer monitors.

Using two computer monitors can be inconvenient, however, where limited physical space is available. Furthermore, the additional computer monitor increases costs and is idle when the dual display functionality is not required.

SUMMARY OF THE INVENTION

Therefore, the object of the present invention is to provide a video signal converter that permits use of a detachable display module of a portable computer with a desktop computer to achieve the dual display functionality, thereby eliminating the need for two computer monitors so as to overcome the aforesaid drawbacks of the prior art.

According to the present invention, a video signal converter is adapted to receive an input video signal from a host and to transmit an output video signal to a detachable display module of a portable computer. The display module is provided with a fastening element. The video signal converter comprises a base, a latch unit, an input electrical connector, a video signal processing unit, and an output electrical connector. The base is adapted for supporting the display module thereon. The latch unit is mounted on the base, and is adapted to engage removably the fastening element on the display module when the display module is supported on the base, thereby retaining removably the display module on the base. The input electrical connector is mounted on the base, and is adapted to be coupled electrically to the host for receiving the input video signal therefrom. The video signal processing unit is mounted in the base, is coupled electrically to the input electrical connector, and is operable so as to convert the input video signal into the output video signal that is suitable for use by the display module. The output electrical connector is mounted on the base, is coupled electrically to the video signal processing unit, and is adapted to be coupled electrically to the display module when the display module is retained on the base so as to permit transmission of the output video signal from the video signal processing unit to the display module.

BRIEF DESCRIPTION OF THE DRAWINGS

Other features and advantages of the present invention will become apparent in the following detailed description of the preferred embodiment with reference to the accompanying drawings, of which:

FIG. 2 is a schematic block diagram of a video signal processing unit of the preferred embodiment;

FIG. 3 is a perspective view to illustrate the display module when moved away from a base of the preferred embodiment;

FIG. 5 is a perspective view to illustrate the display module when supported by the base of the preferred embodiment;

DETAILED DESCRIPTION OF THE PREFERRED EMBODIMENT

Figure 1:
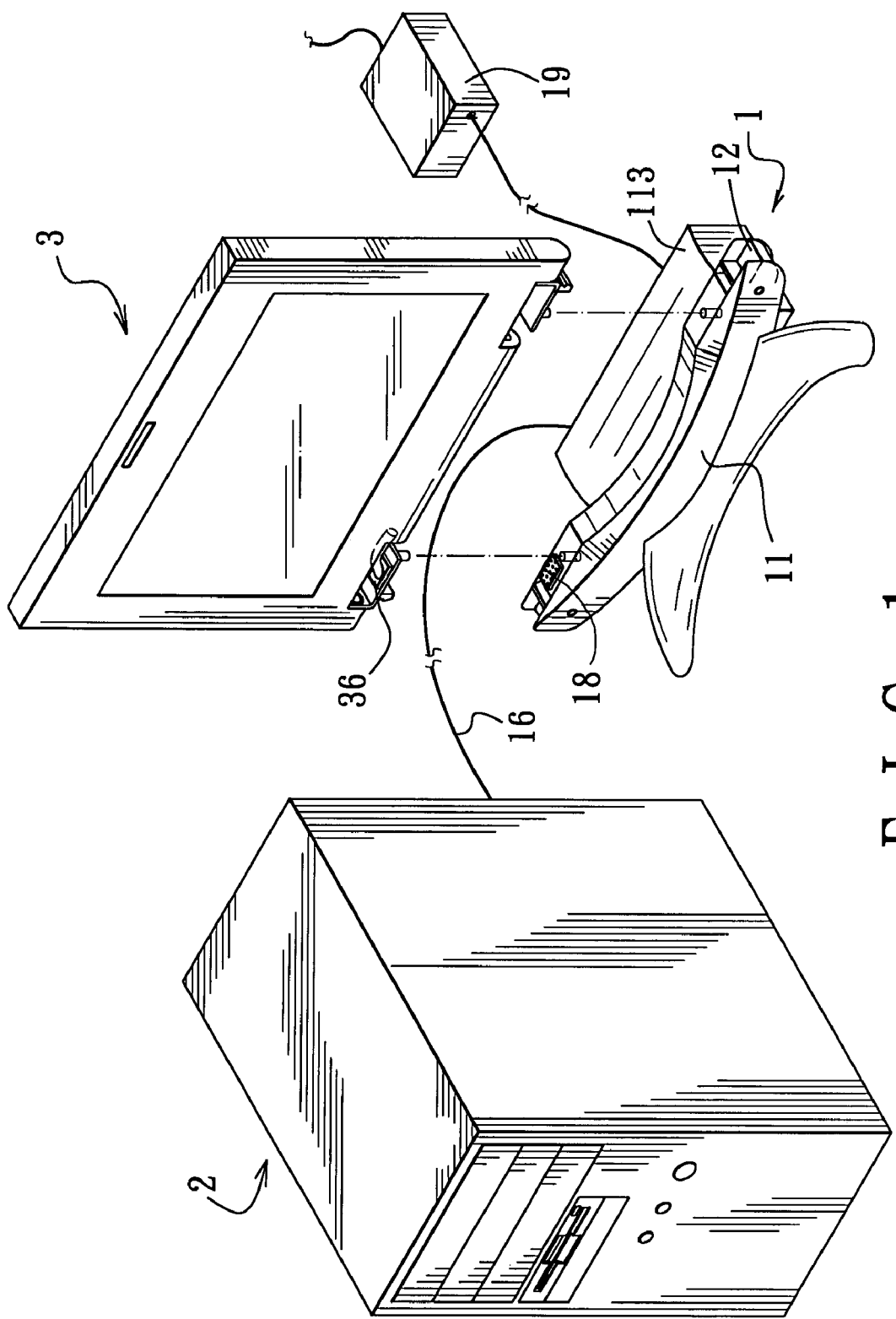
FIG. 1 is a perspective view to illustrate the preferred embodiment of a video signal converter according to the present invention, a host, and a detachable display module of a notebook computer.

Referring to FIGS. 1 and 2, the preferred embodiment of a video signal converter 1 according to this invention is shown to include a base 11, a latch unit 12, first and second input electrical connectors 151, 152, a video signal processing unit 17, and an output electrical connector 18.

The video signal converter 1 is adapted to receive either an analog input video signal or a digital input video signal from a host 2, and to transmit an output video signal to a detachable display module 3 of a portable computer.

The video signal converter 1 further includes a 12-Volt power supply 19 for providing electrical power to the video signal processing unit 17.

As best shown in FIG. 1, the host 2 is in the form of a host system of a desktop computer. A display unit (not shown), in the form of cathode ray tube monitor, is coupled electrically to the host 2 in a known manner. Although the host 2 and the display unit are respectively exemplified using a host system of a desktop computer and a cathode ray tube monitor, it should be apparent that the host 2 may be a host module of a notebook computer or any other computer system, and that the display unit may be a liquid crystal display or any suitable display device.

As best shown in FIG. 2, a video graphics array display card 21 is installed in the host 2. The display card 21 has a video graphic array interface port 22 that outputs the analog input video signal, and a digital visual interface port 23 that outputs the digital input video signal.

Figure 4:
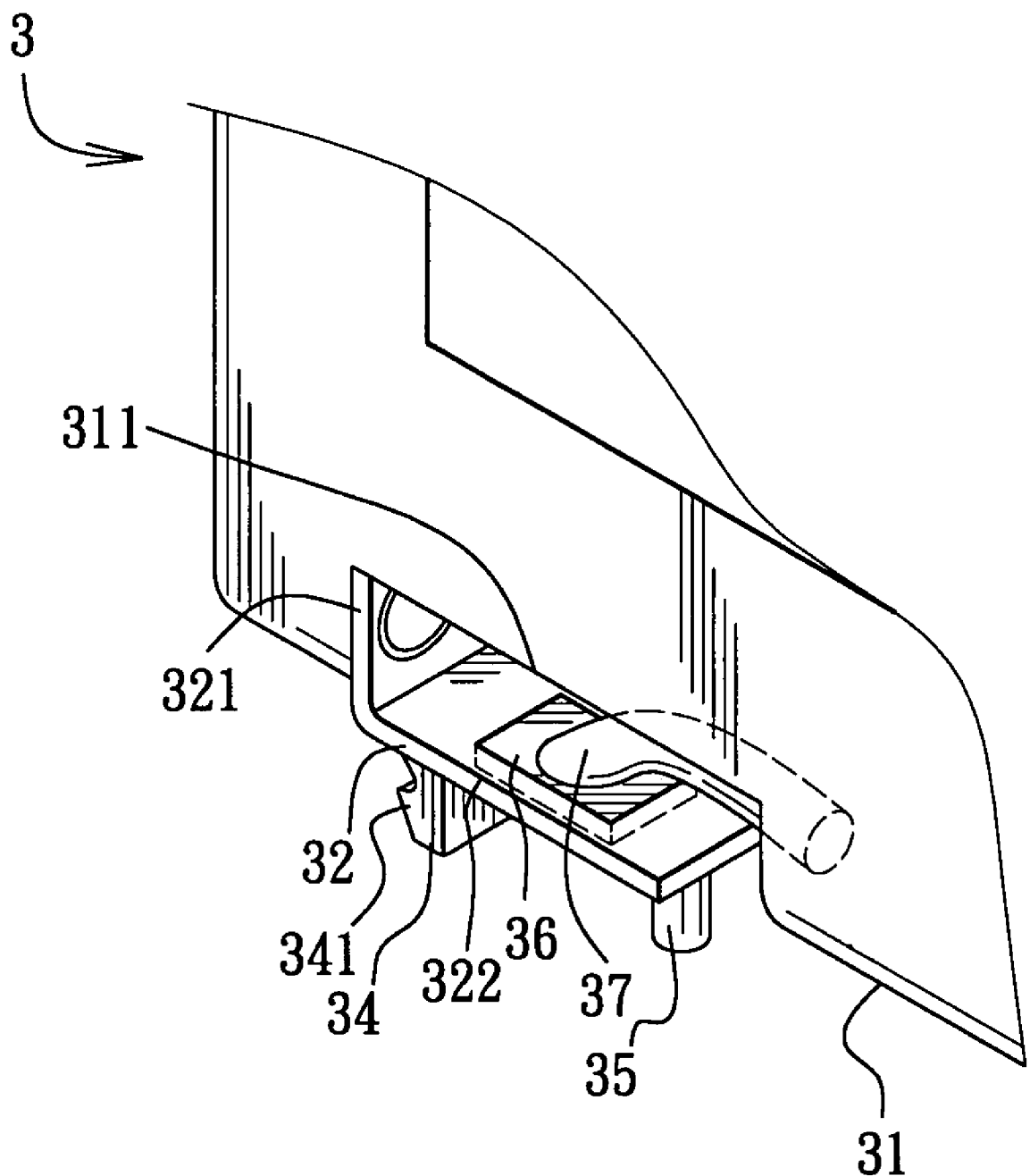
FIG. 4 is a fragmentary perspective view to illustrate a fastening element, a video port and a guide post on a bottom side of the display module.

Referring to FIGS. 3 to 5, the display module 3 is designed for use with a portable computer, such as a notebook computer. In a known design of the display module 3, the display module 3 can be detached from the portable computer for other applications. As shown, the display module 3 has a bottom side 31 with end portions opposite to each other in a longitudinal direction and provided with a pair of fastening elements 34, a video port 36 and a pair of guide posts 35. Each of the end portions of the bottom side 31 of the display module 3 is formed with a notch defined by a respective one of left and right notch-defining peripheries 311, 312. Each of the left and right notch-defining peripheries 311, 312 has left and right walls, and a top wall that interconnects the left and right walls. The bottom side 31 of the display module 3 is further provided with generally L-shaped first and second mounting arms 32, 33 that are connected pivotally and respectively to the left and right notch-defining peripheries 311. As best shown in FIG. 4, the first mounting arm 32 has a first leg 321 connected pivotally to the left wall of the left notch-defining periphery 311, and a second leg 322 that extends from the first leg 321 toward the right wall of the left notch-defining periphery 311. Similarly, as best shown in FIG. 3, the second mounting arm 33 has a first leg 331 connected pivotally to the right wall of the right notch-defining periphery 312, and a second leg 332 that extends from the first leg 331 toward the left wall of the right notch-defining periphery 312.

Each of the fastening elements 34 is formed on and extends downwardly from the second leg 322, 332 of a respective one of the first and second mounting arms 32, 33. In this embodiment, each of the fastening elements 34 has a hook end 341.

Each of the guide posts 35 is formed on and extends downwardly from the second leg 322, 332 of the respective one of the first and second mounting arms 32, 33.

The video port 36 is mounted on the first mounting arm 32 and is coupled electrically to internal circuitry of the display module 3. In particular, the second leg 322 of the first mounting arm 32 is formed with a through hole that is confined by a hole-defining periphery. The video port extends into the through hole, and is secured to the hole-defining periphery. A flexible conductor 37 is provided to connect electrically the video port 36 and the internal circuitry of the display module 3.

As best shown in FIG. 5, the base 11 is adapted for supporting the display module 3 thereon. Referring to FIG. 3, the base 11 has a display supporting side 112, a leg support side 111, and a circuit accommodating portion 113. The display supporting side 112 has end portions opposite to each other in the longitudinal direction, and is disposed to confront the bottom side 31 of the display module 3 when the display module 3 is supported on the base 11. The leg support side 111 is opposite to the display supporting side 112, and is disposed to permit positioning of the base 11 on a table (not shown). The circuit accommodating portion 113 extends rearwardly of the display supporting side 112, and is disposed to receive the video signal processing unit 17 (see FIG. 2) therein.

Figure 6:
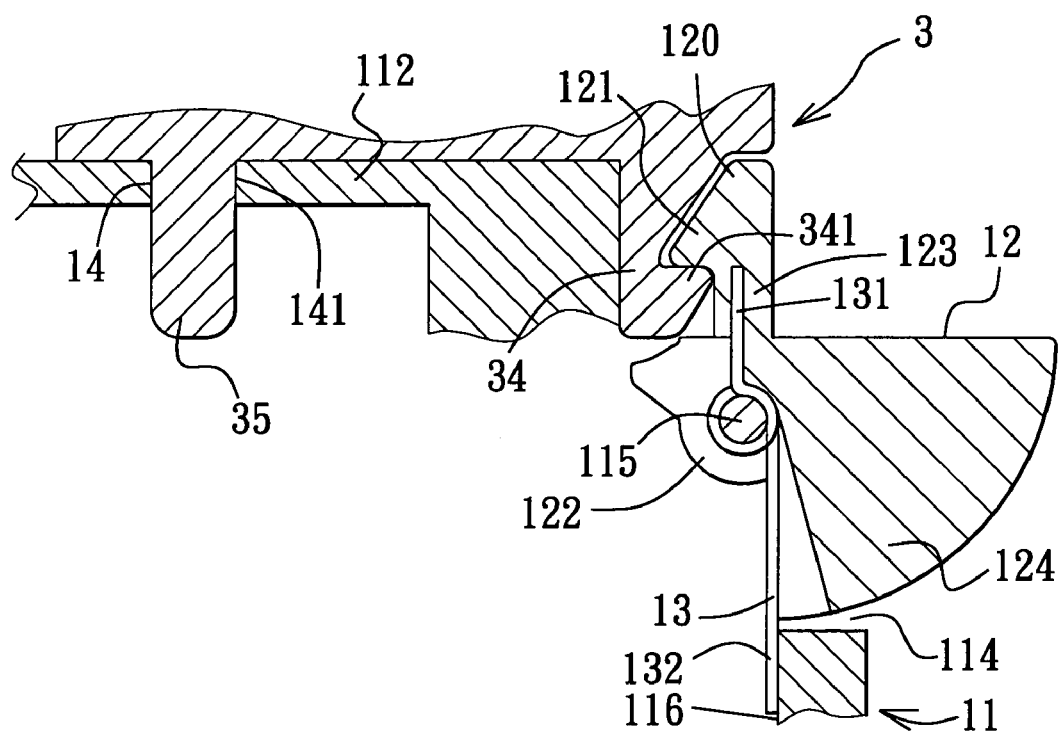
FIG. 6 is a fragmentary sectional view to illustrate a latch unit of the preferred embodiment in a latched position.
Figure 7:
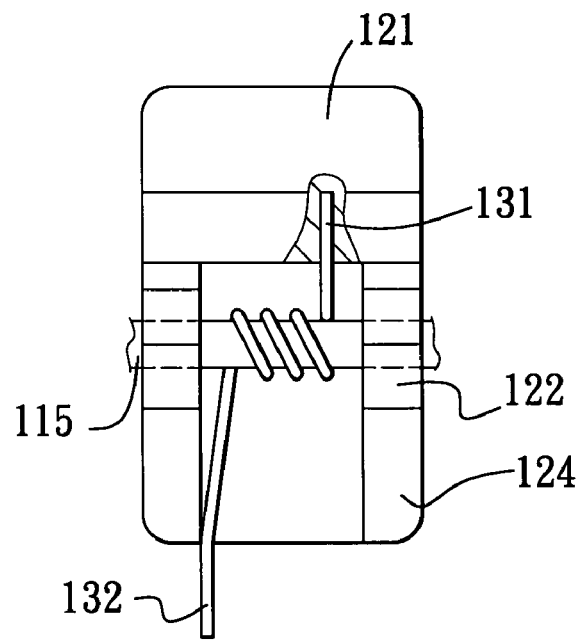
FIG. 7 is another fragmentary sectional view of the preferred embodiment to illustrate a biasing spring that has opposite ends acting on the latch unit and the base.
Figure 8:
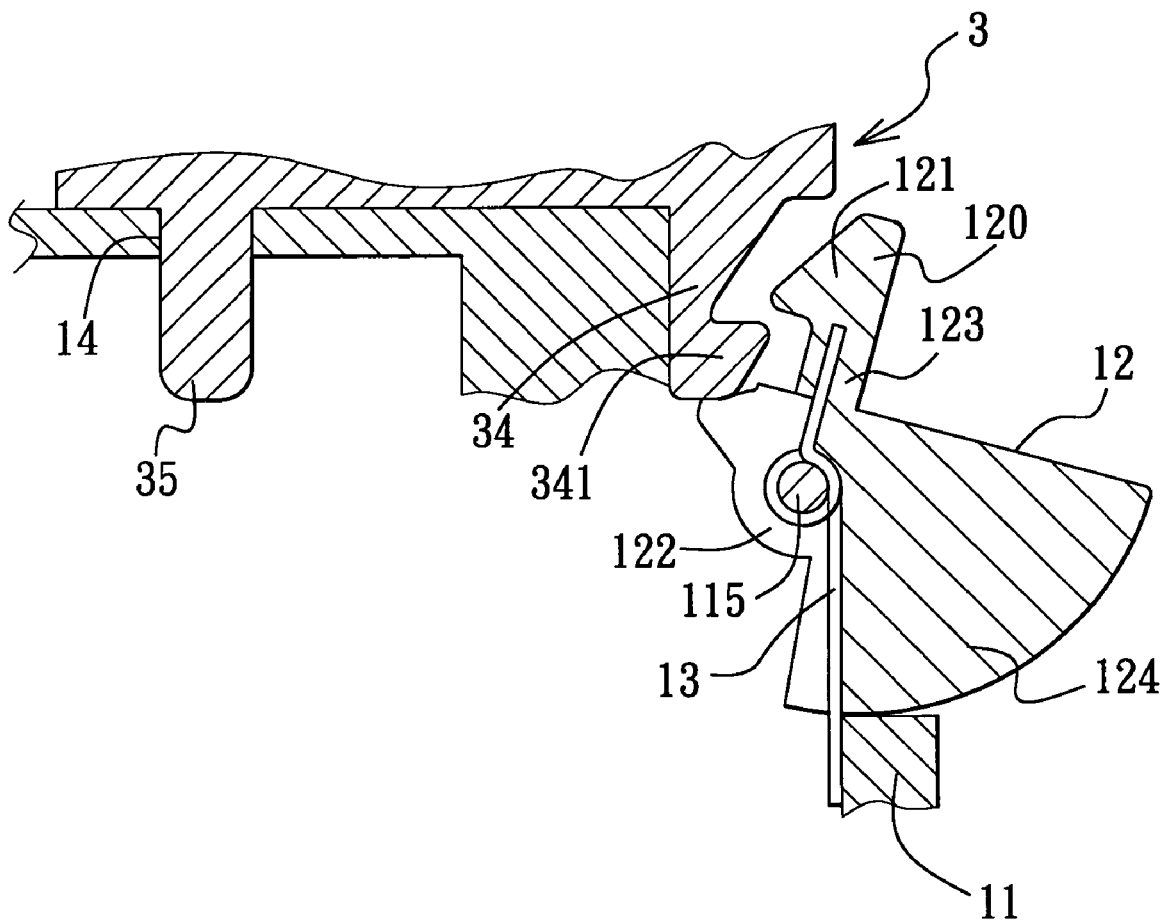
FIG. 8 is a view similar to FIG. 6, illustrating the latch unit in an unlatched position.

With further reference to FIGS. 6 to 8, the latch unit 12 is mounted on the base 11 and is adapted to engage removably the fastening elements 34 on the display module 3 when the display module 3 is supported on the base 11. The construction as such permits the display module 3 to be retained removably on the base 11. In particular, the display supporting side 112 of the base 11 is formed with a pair of grooves 114. Each of the grooves 114 is confined by a groove-defining wall 116, and is formed in a respective one of the end portions of the display supporting side 112. The latch unit 12 includes a pair of latch members 120 disposed respectively in the grooves 114 in the display supporting side 112. In this embodiment, each of the latch members 120 is movable between a latched position, where the latch member 120 is adapted to engage a respective one of the fastening elements 34, and an unlatched position, where the latch member 120 is adapted to disengage from the respective one of the fastening elements 34. Preferably, the latch member 120 has a hook end portion 121, a pivot end portion 122 opposite to the hook end portion 121 and a middle portion 123 disposed between the hook and pivot end portions 121, 122. The hook end portion 121 of the latch member 120 is adapted to engage removably the hook end 341 of the respective one of the fastening elements 34 of the display module 3 when the display module 3 is supported on the base 11, as best shown in FIG. 6. The pivot end portion 122 of the latch member 120 is connected pivotally to a respective one of the groove-defining walls 116. More particularly, each of the groove-defining walls 116 is provided with a pivot shaft 115. The pivot end portion 122 of the latch member 120 is sleeved on a respective one of the pivot shafts 115.

The latch unit 12 further includes a pair of biasing springs 13 for biasing a respective one of the latch members 120 to the latched position. In this embodiment, each of the biasing springs 13 is a torsion spring that is sleeved on a corresponding one of the pivot shafts 115. In particular, the biasing spring 13 has a first spring end 131 that acts on the middle portion 123 of the latch member 120, and a second spring end 132 that acts on the groove-defining wall 116 of the base 11, as best shown in FIGS. 6 and 7.

The latch unit 12 further includes a pair of sector-shaped release members 124 formed on the pivot end portion 122 of a respective one of the latch members 120 and extending outwardly of the respective one of the grooves 114 in the display support side 112. The construction as such permits operation of the release members 124 to move the latch members 120 from the latched position to the unlatched position against biasing action of the biasing springs 13, as best shown in FIG. 8.

As best shown in FIG. 3, the display supporting side 112 of the base 11 is further provided with a pair of guide units 14 for guiding movement of the bottom side 31 of the display module 3 toward and away from the display supporting side 112. In this embodiment, each of the guide unit 14 includes a guide hole 141 formed in the respective one of the end portions of the display supporting side 112 of the base 11 and adapted to permit extension of a respective one of the guide posts 35 on the display module 3 therethrough, as best shown in FIGS. 6 and 8.

Referring back to FIGS. 1 and 2, the first and second input electrical connectors 151, 152 are mounted on the circuit accommodating portion 113 of the base 11, and are adapted to be coupled electrically and respectively to the video graphic array and digital visual interface ports 22, 23, such as with the use of a cable 16, so as to receive the analog or digital input video signal from the host 2.

The video signal processing unit 17, which is received in the circuit accommodating portion 113 of the base 11, is coupled electrically to the first and second input electrical connectors 151, 152, and is operable so as to convert the analog or digital input video signal into the output video signal that is suitable for use by the display module 3. In this embodiment, the video signal processing unit 17 includes a triple analog-to-digital converter (Triple ADC) 171, a digital visual interface receiver (DVI Rx) 172, a Scaler integrated circuit (scaler IC) 173, a low voltage differential signal transmitter (LVDS transmitter) 174, and a DC-to-DC power converter 175. The Triple ADC 171 is coupled electrically to the first input electrical connector 151, and is operable so as to convert the analog input video signal from the first input electrical connector 151 into the digital input video signal. The DVI Rx 172 is coupled electrically to the second input electrical connector 152, and is operable so as to receive the digital input video signal from the second input electrical connector 152. The Scaler IC 173 is coupled electrically to the Triple ADC 171 and the DVI Rx 172, and is operable so as to resize the digital input video signal. The LVDS transmitter 174 is coupled electrically to the Scaler IC 173, and is operable so as to transmit the output video signal to the output electrical connector 18. The DC-to-DC power converter 175 is coupled electrically to the power supply 19, the Triple ADC 171, the DVI Rx 172, the Scaler IC 173, and the LVDS transmitter 174. The DC-to-DC power converter 175 is operable so as to convert the 12 Volts supplied by the power supply 19 to a voltage suitable for use by the Triple ADC 171, the DVI Rx 172, the Scaler IC 173, and the LVDS transmitter 174.

The output electrical connector 18 is mounted on one of the end portions of the display supporting side 112 of the base 11, and is coupled electrically to the LVDS transmitter 174 of the video signal processing unit 17 so as to receive the output video signal therefrom. The output electrical connector 18 is adapted to connect electrically with the video port 36 of the display module 3 when the display module 3 is retained on the base 11, thereby permitting transmission of the output video signal from the video signal processing unit 17 to the display module 3.

It has thus been shown that the video signal converter 1 of this invention includes a base 11 that retains removably a detachable display module 3 of a portable computer thereon, and a video signal processing unit 17 that is adapted to receive one of an analog input video signal and a digital input video signal from a host 2 and to transmit an output video signal to the display module 3. When used with the host 2 and the display module 3, a first image can be shown on the display unit that is connected to the host 2, and a second image can be shown on the display module 3, thereby ensuring dual display functionality of the host 2. As compared to the conventional configuration of using two computer monitors, since the display module 3 can be used with the portable computer, the display module 3 is still functional when detached from the base 11 of the video signal converter 1.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A video signal converter adapted to receive an input video signal from a host and to transmit an output video signal to a detachable display module of a portable computer, the display module being provided with a fastening element, said video signal converter comprising:
    a base adapted for supporting the display module thereon;
    a latch unit mounted on said base and adapted to engage removably the fastening element on the display module when the display module is supported on said base, thereby retaining removable the display module on said base;
    an input electrical connector mounted on said base and adapted to be coupled electrically to the host for receiving the input video signal therefrom;
    a video signal processing unit mounted in said base, coupled electrically to said input electrical connector and operable so as to convert the input video signal into the output video signal that is suitable for use by the display module; and
    an output electrical connector mounted on said base, coupled electrically to said video signal processing unit, and adapted to be coupled electrically to the display module when the display module is retained on said base so as to permit transmission of the output video signal from said video signal processing unit to the display module,
    wherein the display module has a bottom side formed with the fastening element,
    wherein said latch unit includes a latch member movable between a latched position, wherein said latch member is adapted to engage the fastening element, and an unlatched position, where said latch member is adapted to disengage from the fastening element, and
    wherein said latch unit further includes a biasing spring for biasing said latch member to the latched position.

2. The video signal converter as claimed in claim 1, wherein said base has a display supporting side that is disposed to confront the bottom side of the display module when the display module is supported on said base, said display supporting side being formed with a groove that is confined by a groove-defining wall, said latch member being disposed in said groove and being connected pivotally to said groove-defining wall.

3. The video signal converter as claimed in claim 2, wherein said latch member has a hook end adapted to engage removably the fastening element on the display module when the display module is supported on said base.

4. The video signal converter as claimed in claim 2, wherein said latch unit further includes a release member connected to said latch member and extending outwardly of said groove, thereby permitting operation of said release member for moving said latch member to the unlatched position against biasing action of said biasing spring.

5. The video signal converter as claimed in claim 2, wherein said biasing spring is a torsion spring having a first spring end acting on said latch member and a second spring end acting on said base.

6. The video signal converter as claimed in claim 2, wherein the bottom side of the display module being provided with a video port, wherein said output electrical connector is mounted on said display supporting side of said base so as to be adapted to connect electrically with the video port of the display module when the display module is retained on said base.

7. The video signal converter as claimed in claim 2, wherein said display supporting side of said base has two end portions opposite to each other in a longitudinal direction, said groove being formed in one of said end potions of said display supporting side.

8. The video signal converter as claimed in claim 2, wherein said display supporting side of said base is provided with a guide unit that is adapted for guiding movement of the bottom side of the display module toward and away from said display supporting side.

9. The video signal converter as claimed in claim 8, the bottom side of the display module being provided with a guide post, wherein said guide unit includes a guide hole formed in said display supporting side of said base and adapted to permit extension of the guide post therethrough.

* * * * *